United States Patent [19]

Kramer

[11] Patent Number: 4,596,471
[45] Date of Patent: Jun. 24, 1986

[54] BEARING ASSEMBLY

[75] Inventor: James H. Kramer, Akron, Ohio

[73] Assignee: The B. F. Goodrich Company, Akron, Ohio

[21] Appl. No.: 689,109

[22] Filed: Jan. 7, 1985

[51] Int. Cl.$^4$ .............................................. F16C 17/14
[52] U.S. Cl. ...................................................... 384/98
[58] Field of Search .................... 384/97, 98, 125, 215, 384/220, 222, 297, 904; 308/DIG. 12

[56] References Cited

U.S. PATENT DOCUMENTS

| | | | |
|---|---|---|---|
| 1,885,339 | 11/1932 | Evans | 384/297 |
| 1,895,936 | 1/1933 | Merrill | 384/297 |
| 3,023,059 | 2/1962 | Kirk | 384/97 |
| 3,932,004 | 1/1976 | Orndorff, Jr. | 384/97 |
| 3,993,371 | 11/1976 | Orndorff, Jr. | 384/97 |

Primary Examiner—Stuart S. Levy
Assistant Examiner—David Werner
Attorney, Agent, or Firm—Joseph Januszkiewicz

[57] ABSTRACT

A method of making a novel bearing assembly for supporting a drive shaft, having a housing with a central bore in which is mounted a shell with a polygonal shaped opening which receives a plurality of circumferential spaced staves presenting a plurality of flat planar surface that tangentially contact a drive shaft. The staves have an outer layer made of an ultra high molecular weight polyethylene material and an inner layer made of an elastomeric material. The outer layer is received by or may have a projection that is received by a corresponding recess in the shell which is made from a fiberglass material impregnated with an epoxy-resin.

7 Claims, 6 Drawing Figures

BEARING ASSEMBLY

BACKGROUND OF THE INVENTION

This invention relates to a bearing assembly and more particularly to elastomeric journal bearing assemblies which are adapted for use in supporting marine propeller shafts. Elastomeric journal bearings have been found to be particularly suited for this purpose because of their exceptional ability to withstand the effects of corrosive fluids and to abrasion resulting from bits of foreign materials which are carried in suspension in the sea water or other liquids in which the shaft and journal bearing assembly operates. Such elastomeric journal bearing assemblies have been made and are still being made with rigid metallic support members but the materials are more expensive and the manufacturing costs are higher. A further advantage of the elastomeric journal bearings is that since they operate in a liquid medium they are self lubricated and therefore highly desirable for marine use as for the stern propeller shaft journals.

The present invention is directed to a new and improved bearing assembly and the method of making such assembly utilizing a novel combination of shell and replaceable staves wherein the plurality of circumferentially spaced staves with flat bearing members provides support for a rotating shaft. The invention employs a molding process wherein the individual staves have radially outwardly extending projections about which fabric impregnated with plastic is wrapped filling in the recesses between the projections as well as around the projections to make a cylindrical shell. The radial outward portion of the stave including the projection is made from ultra high molecular weight polyethylene such that after curing of the shell, the staves are freely removable since the plastic shell does not adhere or stick to the ultra high molecular weight polyethylene. This process is considerably less expensive than the corresponding use of a machined recess or dovetail groove as in a brass bushing to receive the dovetail projection of the bearing element. With the use of this process it is particularly advantageous to fabricate a bearing assembly wherein adjacent bearing elements have sufficient clearance between them to provide a water course for lubrication purposes while maintaining their precise position relative to adjacent bearing elements or staves. A unique advantage of this invention is that the removeable staves are used in building the rigid housing assuring precise fitting while reducing the cost of fabrication. In this manufacturing process the rigid outer shell can be machined to a precise outer diameter as the job requires thereby reducing inventory. Additional layers of fiberglass reinforced plastic can be molded onto the outer shell to increase the diameter of the outer shell. The bearing assembly is simple in construction and has the attributes of a machined bearing assembly.

SUMMARY OF THE INVENTION

The present invention is directed to a new and improved bearing assembly having a rigid non-metallic outer shell supporting a plurality of circumferentially spaced staves which staves are trapezoid in cross section with means to interlock their connection to the shell. Each stave is constructed from a semi-rigid material such as an ultra high molecular weight polyethylene which is bonded to an inner strip of an elastomer. The staves are held in circumferentially spaced relationship by their individual rigid connection to the shell and held in axial alignment by end caps.

DETAILED DESCRIPTION

Figure 1:
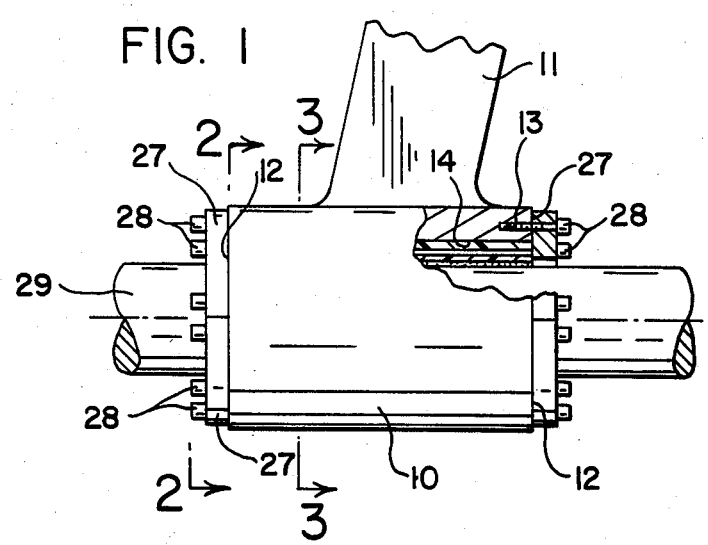
FIG. 1 is a side elevational view of a strut and bearing assembly for supporting a rotatable shaft with a portion of the housing and bearing assembly broken away taken on line 1—1 of FIG. 2.
Figure 2:
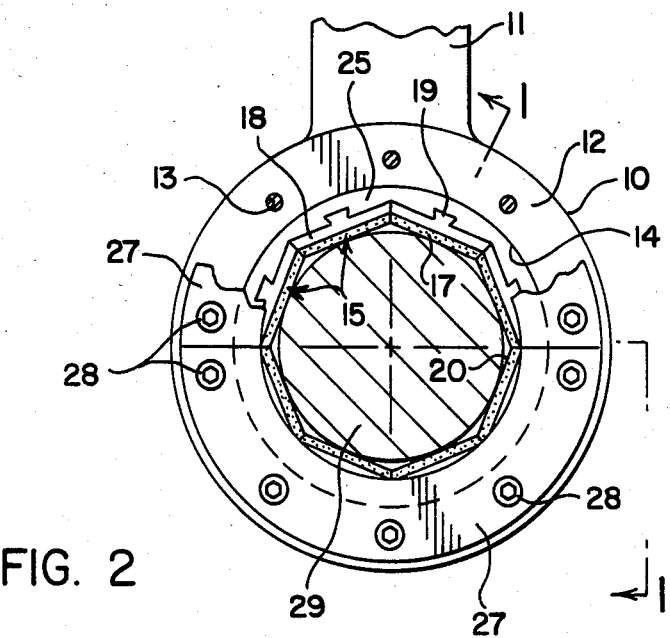
FIG. 2 is a front elevational view of the strut and bearing assembly taken on line 2—2 of FIG. 1 with a portion of the cap broken away to show the bearing staves.

Referring to the drawings, wherein like reference numerals designate like or corresponding parts throughout the several views, there is shown in FIG. 1 a longitudinally extending bearing housing 10 supported by a strut 11. Housing 10 has a pair of annular end sections 12, with each end section having a plurality of circumferentially spaced threaded bores 13. The housing 10 has a central bore 14 to accommodate a bearing unit to be described. The bearing unit has a plurality of circumferentially spaced staves 15 which include an inner trapezoidal shaped bearing element 17 made of an elastomeric material and an outer trapezoidal shaped bearing support element 18 that is made of an ultra high molecular weight polyethylene that is bonded to the elastomeric bearing element 17. Support bearing element 18 has a dovetail shaped projection 19 extending radially outwardly from its outermost surface and intergal with the element 18. Such dovetail projection 19 can be cast or machined thereon.

An elastomer is defined as a substance that can be stretched at room temperatures to at least twice its original length and, after having been stretched and the stress removed, returns with force to approximately its original length in a short time. (See Glossary of Terms as prepared by ASTM Committee D11 on Rubber and Rubberlike Materials. Published by the American Society for Testing Materials).

The elastomeric or rubber material that can be used can be any of the well known elastomers including for example natural rubber, copolymers of butadiene and acrylonitrile, copolymers of butadiene and styrene, copolymers of butadiene and alkyl acrylates, butyl rubber, olefin rubbers such as ethylene-propylene and EPDM rubber, fluorocarbons rubbers, fluoroisilicone rubbers, silicone rubbers, chlorosulfonated polyethylene, polyacrylates, polybutadiene, polychloroprene and the like.

Figure 3:
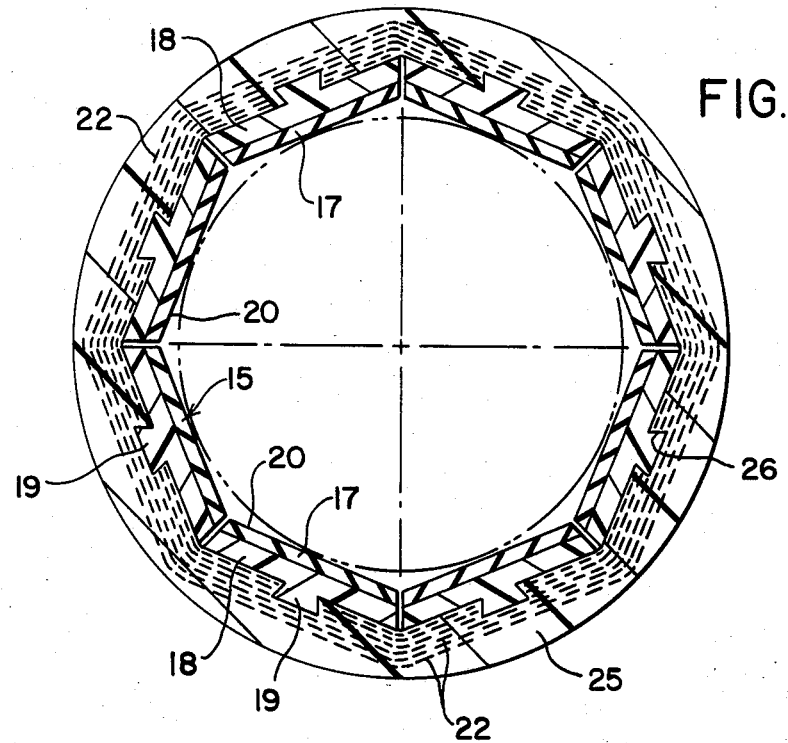
FIG. 3 is a cross-sectional view of the bearing assembly taken on line 3—3 of FIG. 1 showing the bearing detached.
Figure 4:
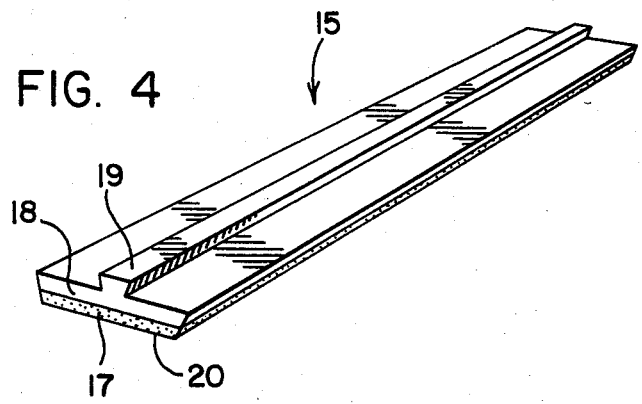
FIG. 4 is a perspective view of a removable stave or bearing element.

The bearing element 18 is made of ultra high molecular weight polyethylene having a melt flow index less than 0.15. To prepare such bearing elements, an elongated flat sheet of elastomeric material such as nitrile rubbers such as polymers of butadiene and acrylonitrile is placed flat into a mold and vulcanized. A second sheet of ultra high molecular weight polyethylene is then molded into a flat sheet. Each of these individual sheets are cut into proper length or strips having proper angularly disposed sides to provide their trapezoidal cross sectional shape. The first and second sheets may be bonded together first and then cut into trapezoidal shapes such that the elastomeric inner bearing element 17 has a smaller base or bearing surface 20 than the bearing support element 18 supporting such bearing element 17, as seen in FIGS. 3 and 4. Such base 20 is a radially disposed inner bearing surface. The dovetail 19 is machined into the outer portion of the outer bearing support element 18. FIG. 3 shows the bearing elements or staves 15 with a clearance space between them to provide sufficient clearance to insure a proper flow of water for lubricating the rubber bearing surfaces 20. To prepare the bearing assembly a plurality of staves are placed on a polygonal shaped mandrel and maintained thereon in any manner known in the art as by pulling a vacuum such that as the mandrel and staves are rotated a woven fabric of fiberglass designated 22 is wrapped or wound onto the outer peripheral surfaces of the staves. Such wrapping is done to fill the voids or recesses between adjacent staves. The wrapping is continued until a cylindrical shell 25 is formed. As the fabric is wrapped an epoxy resin is impregnated into the fabric such that as the overwrapping of the fabric continues the epoxy resin is built up and a dovetail groove 26 is formed in the shell 25. The epoxy resin can be sprayed or fed from a suitable reservoir or supply source onto the fabric and with the aid of a doctor blade a uniform coating is placed onto the fabric. The epoxy resin can be applied manually or by any known mechanical means. The number of layers of impregnated fiberglass that is applied around the outer surfaces of the circumferentially spaced staves 15 is determined by the desired size needed. After the epoxy resin has set, the outer surface can be machined to the desired diameter to form an outer cylindrical shell 25.

A specific example of the epoxy resin useful in the present invention is one by the tradename "APCO" available from Applied Plastics Co., Inc. of 612 Franklin Avenue, El Segundo, Calif. 90245. The epoxy resin has a specific gravity of 1.165 and its accompanying curing agent or hardener has a specific gravity of 1.809. The epoxy resin has a shore D 25° C. hardness of 84 with a glass transition temperature of 196° F. The viscosity of the epoxy resin is 2000 cps (1800±300); while the viscosity of the hardener is 410 cps (310±200). Another epoxy resin that can be used is one known as "EVERFIX EPOXY RESIN" having a density of 8.5 lbs. per gallon. The hardner used with such epoxy resin is a modified alaphatic amine adduct available through Fibre Glass-Ever Cost Co., Inc. 66700 Cornell Road, Cincinnati, Ohio 45242. With this structure of the combined fiberglass reinforced outer shell 25 the stave like bearing elements 15 are replaceable since the epoxy will not adhere to the ultra high molecular weight polyethylene. Thus the staves can be slid out of the grooves 26 and replaced in the bearing assembly. Such outer shell 25 and the staves 15 are located within the central bore 14 of housing 10, with the inner peripheral surfaces of the staves 15 abutting the drive shaft 29. As seen in FIG. 3, the staves 15 are shown with a clearance space between adjacent sides to assure ease of replacement and insure an adequate flow of water for lubricating purposes. The respective dovetails of the staves 15 prevents rotation of the staves within such shell 25. The conventional and expensive system of machining dove-tailed grooves into the outer supporting sleeve or shell is eliminated however the rigidity of the staves is maintained, permitting the staves to be replaced easily. The staves 15 are retained within such central bore by a pair of semi-circular retainer rings 27 acting as retainer means mounted on the respective end sections 12 of the cylindrically shaped housing 10. Rings 27 have a plurality of circumferentially spaced bores which receive cap screws 28 which are threaded into the respective threaded bores 13 to thereby securely fasten the staves 15 on the housing 10 in place on the shaft 29.

Figure 5:
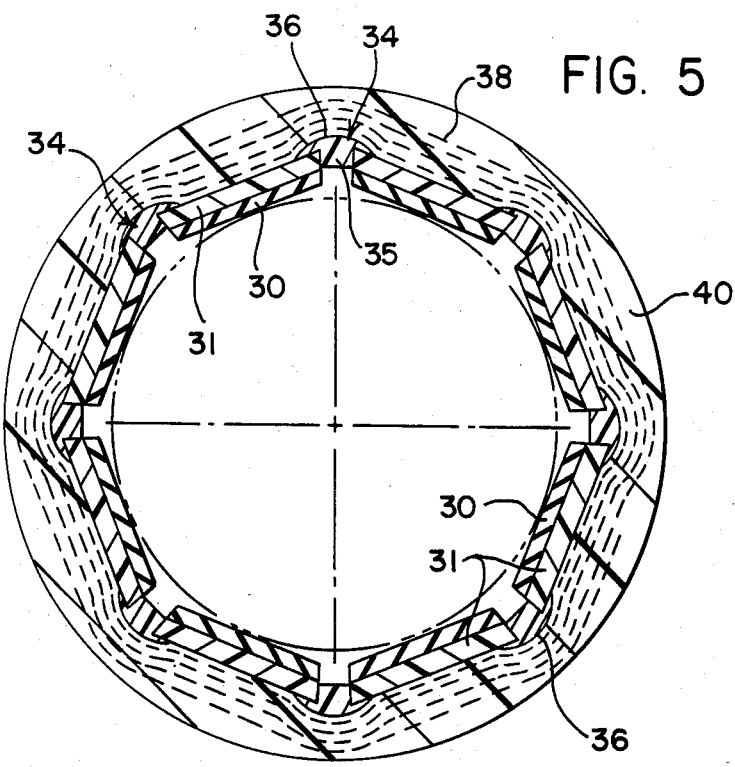
FIG. 5 is a cross-sectional view similar to FIG. 3, of a modified form of a bearing assembly.
Figure 6:
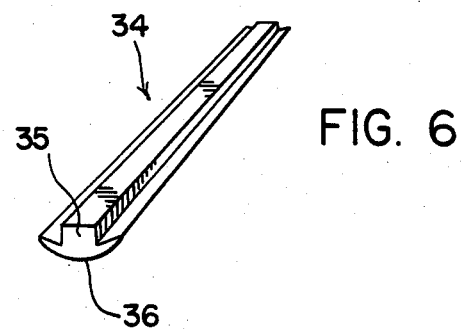
FIG. 6 is a perspective view of a spacer used in the modified form of the bearing assembly.

A modification of the invention is shown in FIG. 5 wherein each of the circumferentially spaced staves have an inner trapezoidal shaped bearing element 30 made of an elastomeric material as in the first described embodiment, and an outer trapezoidal shaped bearing support element 31 made of an ultra high molecular weight polyethylene material that is bonded to the elastomeric bearing element 30. The cross sectional shape of the modified form of the invention eliminates the need of the dovetailed shaped projection 19 by utilizing a fiberglass-epoxy pre-form spacer 34. Each spacer 34 has a rectangular shaped body portion 35 in cross and a rounded head 36. As seen in FIGS. 5 and 6, the rectangular shaped body portion 35 is a longitudinally extending spacer element that separates adjacent staves while the arcuately shaped head 36 will permit the convenient forming of the shell by permitting the wrapping of the woven fabric of fiberglass around the periphery of the circumferentially spaced staves to form the outer bearing shell. In this modification the plurality of staves can be placed on a polygonal shaped mandrel separated by the spacers 34. The staves are maintained or held in place thereon as by pulling a vacuum thereon such that as the mandrel and staves are rotated a woven fabric of fiberglass designated 38 is wrapped or wound onto the outer peripheral surface of the staves and the spacers 34. As such wrapping is done, epoxy resin is spread onto the fabric impregnating such fabric with the epoxy resin such that as the overwrapping of the fabric continues, the epoxy resin is built up and forms a shell 40. The epoxy resin can be sprayed or fed from a suitable reservoir or supply source onto the fabric and with the aid of a doctor blade, form a uniform coating onto the fabric. The epoxy resin can be applied manually or by any known mechanical means. The number of layers of impregnated fiberglass that is applied around the outer surface to form the shell 40 is determined by the desired size needed. The epoxy resin and fiberglass wrapping 38 on setting becomes integral with the circumferentially spaced spacers 34 with the spacers acting as abutment means. After the epoxy resin has set, the outer surface can be machined to the desired diameter to form the outer rigid cylindrical shell, with the spacers 34 forming abutment means, guides or tapered grooves for retaining or locking the staves in place to prevent movement or rotation when in use. The tapered grooves between the spacers or abutment means 34 receive the trapezoidal shaped bearing support element 31 of the removable staves. Once the staves are assembled into the shell 40 and the shell slid into the bore 14 of housing 10, the shell 40 and staves are retained therein by rings 27 and cap screws 28.

Various modifications are contemplated and may be resorted to by those skilled in the art without departing from the described invention, as hereinafter defined by the appended claims, as only a preferred embodiment thereof has been disclosed.

I claim:

1. A bearing assembly having a housing with a central bore therein, a cylindrical shell of fiberglass-epoxy with a central opening therethrough mounted in said bore of said housing, said central opening being polygonal defining a plurality of flat interconnecting surfaces, each flat surface having a recess extending into said shell, a plurality of circumferentially spaced removeable staves located in said central opening, each stave having a radially disposed outer layer of ultra high molecular weight polyethylene material and a radially disposed inner layer made from an elastomer, each outer layer having an abutment extending into one of said recesses, each of said inner layers having a flat surface, all of said flat surfaces of said inner layers defining a polygonal shaped aperture that is adapted to contact and support a drive shaft journaled in said aperture, and retainer means mounted on said housing and operative to retain said removable staves in said bearing assembly.

2. A bearing assembly as set forth in claim 1 wherein each of said staves has a clearance space beside an adjacent stave to facilitate the flow of water through said clearance space and the clearance between said staves and such drive shaft.

3. A bearing assembly as set forth in claim 1 wherein said outer shell is made of a fiberglass reinforced plastic material.

4. A bearing assembly as set forth in claim 3 wherein said inner member is made of an elastomeric material that is bonded to said outer layer of polyethylene material.

5. A bearing assembly having a housing with a central bore therein, a cylindrical shell made of fiber fabric reinforced with a plastic resin with a central opening therethrough mounted in said bore of said housing, said central opening being polygonal defining a plurality of flat adjacent surfaces, said fiber reinforced cylindrical shell having a plurality of recesses that extend radially outwardly from each of said flat surfaces into said shell, a plurality of circumferentially spaced removable staves located in said recesses of said shell and projecting into said central opening, each of said staves having a radially disposed outer layer and a radially disposed inner layer, said outer layer of said stsves being received by said recesses to permit axial sliding movement of said staves relative to said shell for removal therefrom, retaining means mounted on said housing and operative to secure said removable staves in said central opening, each of said inner layers is made of an elastomeric material that is bonded to said outer layers, said outer layer of each of said staves made of an ultra high molecular weight polyethylene.

6. A bearing assembly as set forth in claim 5 wherein each of said staves has a pair of side surfaces that are transverse to their said respective flat surfaces of said inner layers, and adjacent side surfaces of said stave have clearance spaces therebetween to define a water course.

7. A bearing assembly as set forth in claim 6 wherein said outer layer of said staves are trapezoidal in cross section, and said recesses are tapered to slidingly receive said staves.

* * * * *